(12) United States Patent
Kremo et al.

(10) Patent No.: US 9,398,599 B2
(45) Date of Patent: Jul. 19, 2016

(54) COOPERATIVE SPECTRUM SENSING METHOD AND IN-VEHICLE WIRELESS COMMUNICATION DEVICE

(71) Applicant: TOYOTA JIDOSHA KABUSHIKI KAISHA, Toyota-shi, Aichi (JP)

(72) Inventors: Haris Kremo, Tokyo (JP); Onur Altintas, Kawasaki (JP)

(73) Assignee: TOYOTA JIDOSHA KABUSHIKI KAISHA, Aichi (JP)

( * ) Notice: Subject to any disclaimer, the term of this patent is extended or adjusted under 35 U.S.C. 154(b) by 0 days.

(21) Appl. No.: 14/897,039

(22) PCT Filed: May 29, 2014

(86) PCT No.: PCT/JP2014/002845
§ 371 (c)(1),
(2) Date: Dec. 9, 2015

(87) PCT Pub. No.: WO2014/199581
PCT Pub. Date: Dec. 18, 2014

(65) Prior Publication Data
US 2016/0128075 A1    May 5, 2016

(30) Foreign Application Priority Data
Jun. 10, 2013   (JP) .................................. 2013-121963

(51) Int. Cl.
*H04B 7/00*   (2006.01)
*H04W 72/08*  (2009.01)
*H04W 28/02*  (2009.01)
*H04W 24/08*  (2009.01)
*H04W 88/02*  (2009.01)

(52) U.S. Cl.
CPC ............ *H04W 72/085* (2013.01); *H04W 24/08* (2013.01); *H04W 28/0226* (2013.01); *H04W 28/0236* (2013.01); *H04W 88/02* (2013.01)

(58) Field of Classification Search
None
See application file for complete search history.

(56) References Cited

U.S. PATENT DOCUMENTS

2003/0053522 A1* 3/2003 Hayoun ................ H04L 25/023
                                                            375/147
2003/0165131 A1* 9/2003 Liang ................... H04B 1/7103
                                                            370/342

(Continued)

FOREIGN PATENT DOCUMENTS

JP    2002-512746 A    4/2002
WO    98/34424 A2      8/1998

OTHER PUBLICATIONS

Marco Di Felice; et al., "Cooperative Spectrum Management in Cognitive Vehicular Ad Hoc Networks", IEEE Vehicular Networking Conference (VNC), 2011, pp. 47-54.

(Continued)

*Primary Examiner* — Dominic Rego
(74) *Attorney, Agent, or Firm* — Sughrue Mion, PLLC

(57) ABSTRACT

Efficient spectrum sensing is implemented taking into account the fading caused by multipath fading and shadow fading in a mobile environment. A cooperative spectrum sensing method performed by a plurality of in-vehicle wireless communication devices, includes: a decorrelation time acquisition step for acquiring a first decorrelation time, which is a time interval in which channel fluctuations resulting from multipath fading are decorrelated, and a second decorrelation time, which is a time interval in which channel fluctuations resulting from shadow fading are decorrelated; a sensing step for repeatedly performing sensing at a time interval equal to or longer than the first decorrelation time; a notification step for wireless transmitting a plurality of most recent sensing results at a time interval equal to or longer than the second decorrelation time; and a determination step for determining a state of a channel on the basis of the plurality of sensing results transmitted from the plurality of in-vehicle wireless communication devices.

15 Claims, 9 Drawing Sheets

(56) References Cited

U.S. PATENT DOCUMENTS

| | | | |
|---|---|---|---|
| 2007/0249340 A1* | 10/2007 | Hiltunen | H04W 16/06 455/433 |
| 2008/0233989 A1* | 9/2008 | Kim | H04L 1/0003 455/517 |
| 2009/0149208 A1 | 6/2009 | Huttunen et al. | |
| 2009/0304198 A1* | 12/2009 | Herre | G10L 19/008 381/66 |
| 2011/0173005 A1* | 7/2011 | Hilpert | G10L 19/008 704/500 |

OTHER PUBLICATIONS

Amir Ghasemi, et al., "Asymptotic Performance of Collaborative Spectrum Sensing under Correlated Log-Normal Shadowing", IEEE Communications Letter, Jan. 2007, pp. 34-36, vol. 11, No. 1.

S.P. Herath, et al., "Energy Detection of Unknown Signals in Fading and Diversity Reception", IEEE Transactions on Communications, Sep. 2011, pp. 2443-2453, vol. 59, No. 9.

Haris Kremo, et al., "On Detecting Spectrum Opportunities for Cognitive Vehicular Networks in the TV White Space", J Sign Process Syst., 2013, pp. 243-254, vol. 73, No. 3.

Alexander W. Min, et al., "Impact of Mobility on Spectrum Sensing in Cognitive Radio Networks", Proceedings of the 2009 ACM workshop on Cognitive radio networks. ACM, 2009.

Shridhar Mubaraq Mishra, et al., "Cooperative Sensing among Cognitive Radios", Communications, Jun. 2006. ICC '06. IEEE International Conference on, pp. 1658-1663, vol. 4.

Xiao Yu Wang, et al., "A Novel Sensing Coordination Framework for CR-VANETs", IEEE Transactions on Vehicular Technology, May 2010, pp. 1936-1948, vol. 59, No. 4.

International Search Report of PCT/JP2014/002845, dated Dec. 4, 2014. [PCT/ISA/210].

* cited by examiner

Fig. 3

122 DECORRELATION DISTANCE STORAGE UNIT

| GEOGRAPHIC CATEGORY | | MULTIPATH DECORRELATION DISTANCE | SHADOWING DECORRELATION DISTANCE |
|---|---|---|---|
| URBAN AREA | ORDINARY | $Dc\_urban\_1$ | $Ds\_urban\_1$ |
| | MULTISTORIED BUILDING ZONE | $Dc\_urban\_2$ | $Ds\_urban\_2$ |
| | HIGHWAY ZONE | $Dc\_urban\_3$ | $Ds\_urban\_3$ |
| | ... | ... | ... |
| SUBURB AREA | ORDINARY | $Dc\_suburban\_1$ | $Ds\_suburban\_1$ |
| | DENSELY BUILT-UP ZONE | $Dc\_suburban\_2$ | $Ds\_suburban\_2$ |
| | ... | ... | ... |
| RURAL AREA | ORDINARY | $Dc\_rural\_1$ | $Ds\_rural\_1$ |
| | MOUNTAIN AREA | $Dc\_rural\_2$ | $Ds\_rural\_2$ |
| | PLAIN AREA | $Dc\_rural\_3$ | $Ds\_rural\_3$ |
| | ... | ... | ... |

COOPERATIVE SPECTRUM SENSING METHOD AND IN-VEHICLE WIRELESS COMMUNICATION DEVICE

CROSS REFERENCE TO RELATED APPLICATIONS

This application is a National Stage of International Application No. PCT/JP2014/002845 filed May 29, 2014, claiming priority based on Japanese Patent Application No. 2013-121963, filed Jun. 10, 2013, the contents of all of which are incorporated herein by reference in their entirety.

TECHNICAL FIELD

The present invention relates to cooperative spectrum sensing.

BACKGROUND ART

Significant progress has been achieved in research and development of applications that take advantage of inter-vehicle communication. Since the ITS (Intelligent Transport Systems) applications enabling various types of cooperation by inter-vehicle communication can be realized, the role of inter-vehicle communication is expected to become increasingly important in the future. However, the problem is that frequency resources allocated to inter-vehicle communication are insufficient and there is no communication band sufficient for implementing the ITS applications.

The use of a cognitive radio has been investigated as means for resolving the aforementioned problem. The cognitive radio is a technique for increasing the usage efficiency of frequency at which a wireless communication device recognizes and acknowledges the surrounding radio environment and adaptively changes the frequency or wireless system used for wireless communication. In the inter-vehicle communication, a method for using a spectrum sensing cognitive radio that performs communication at an unused empty frequency has been considered. In particular, a form in which the frequency which is allocated to, but is actually not used by a licensed user (primary user) is used by an unlicensed user (secondary user) has been considered. Such a frequency is called a secondarily usable frequency or a white space.

A method of performing spectrum sensing is used to detect the white space. Under the moving conditions such as realized in a vehicle or the like, the movement of the vehicle is followed by significant channel fluctuations. Therefore, a technique for performing adaptive sensing is needed. When one vehicle is sensed a plurality of times or a plurality of vehicles is sensed at the same time, where there is a correlation between the measurements, a diversity effect cannot be obtained. Patent Literature 1 suggests increasing the sensing accuracy by using temporal diversity, spatial diversity, or a combination thereof.

Channel fluctuations (fading) are caused by two reasons, namely, multipath fading and shadow fading. The multipath fading is a phenomenon occurring for a comparatively short time and on a comparatively short distance scale, whereas the shadow fading is a phenomenon occurring for a comparatively long time and on a comparatively large distance scale. Most research considers only shadow fading (Non-Patent Literature 1 to 3) or only multipath fading (Non-Patent Literature 4 and 5) in the cooperative spectrum sensing. In Non-Patent Literature 6, both the multipath fading and the shadow fading are considered, but the sensor is presumed to be in a fixed node, and the system cannot be directly used in the mobile environment.

CITATION LIST

Patent Literature

PTL 1: Japanese Translation of PCT Application No. 2002-512746

Non-Patent Literature

NPL 1: Ghasemi, Amir, and Elvino S. Sousa. "Asymptotic performance of collaborative spectrum sensing under correlated log-normal shadowing." Communications Letters, IEEE 11.1 (2007): 34-36

NPL 2: Min, Alexander W., and Kang G. Shin. "Impact of mobility on spectrum sensing in cognitive radio networks." Proceedings of the 2009 ACM workshop on Cognitive radio networks. ACM, 2009

NPL 3: Di Felice, Marco, Kaushik Roy Chowdhury, and Luciano Bononi. "Cooperative spectrum management in cognitive vehicular ad hoc networks." Vehicular Networking Conference (VNC), 2011 IEEE. IEEE, 2011

NPL 4: Wang, Xiao Yu, and Pin-Han Ho. "A novel sensing coordination framework for CR-VANETs. "Vehicular Technology, IEEE Transactions on 59.4 (2010): 1936-1948

NPL 5: Herath, S. P., N. Rajatheva, and C. Tellambura. "Energy detection of unknown signals in fading and diversity reception." Communications, IEEE Transactions on 59.9 (2011): 2443-2453

NPL 6: Mishra, S. M.; Sahai, A.; Brodersen, R. W., "Cooperative Sensing among Cognitive Radios," Communications, 2006. ICC '06. IEEE International Conference on, vol. 4, no., pp. 1658, 1663, June 2006

SUMMARY OF INVENTION

Technical Problem

As mentioned hereinabove, methods for performing cooperative spectrum sensing with consideration for both the multipath fading and the shadow fading have not been heretofore studied. In particular, no research accounting for the fading of those two types in a mobile environment has been conducted.

Accordingly, it is an object of the present invention to provide a cooperative spectrum sensing technique taking into account the fading caused by multipath fading and shadow fading in a mobile environment, thereby enabling highly efficient spectrum sensing.

Solution to Problem

The present invention provides a cooperative spectrum sensing method performed by a plurality of in-vehicle wireless communication devices, including:

a decorrelation time acquisition step in which each in-vehicle wireless communication device acquires a first decorrelation time (multipath coherence time), which is a time interval in which channel fluctuations resulting from multipath fading are decorrelated, and a second decorrelation time (shadowing decorrelation time), which is a time interval in which channel fluctuations resulting from shadow fading are decorrelated;

a sensing step in which each in-vehicle wireless communication device repeatedly performs sensing at a time interval equal to or longer than the first decorrelation time;

a notification step in which each in-vehicle wireless communication device performs wireless transmission of a plurality of most recent sensing results at a time interval equal to or longer than the second decorrelation time; and a determination step in which at least any of the plurality of in-vehicle wireless communication devices determine a state of a channel on the basis of the plurality of sensing results transmitted from the plurality of in-vehicle wireless communication devices.

The decorrelation time is a time in which, when a plurality of spectral sensing operations is performed, the measurement results can be expected not to be correlated where the measurements are performed at timings separated by time intervals thereof. In this case channel fluctuations can be generally attributed to two causes, namely, multipath fading and shadow fading. The multipath fading is a fluctuation caused by a multipath and is a phenomenon with a comparatively small temporal and spatial scale (about half a wavelength). Meanwhile, the shadow fading is a fluctuation caused by shielding and reflection of electromagnetic waves by buildings and the like and is a phenomenon with a comparatively large temporal and spatial scale (about several tens to several hundreds of meters). In the present invention, the decorrelation time of multipath fading (first decorrelation time) and the decorrelation time of shadow fading (second decorrelation time) are acquired to take both the multipath fading and the shadow fading into consideration. The decorrelation time of multipath fading is also referred to hereinbelow as multipath coherence time, and the decorrelation time of shadow fading is also referred to hereinbelow as shadowing decorrelation time.

Any method for acquiring the decorrelation time may be implemented. For example, the decorrelation time can be determined from the decorrelation distance and the movement speed of an in-vehicle wireless communication device. The decorrelation distance, as referred to herein, is a distance at which, when a plurality of spectral sensing operations is performed, the measurement results can be expected not to be correlated where the measurements are performed at positions separated by distance intervals thereof. In the present invention, the decorrelation distance of multipath fading (first decorrelation distance) and the decorrelation distance of shadow fading (second decorrelation distance) can be stored in advance for each category of location. Examples of categories of location include urban areas, suburban areas, and rural areas. The number of the categories obviously may be larger than three. The in-vehicle wireless communication device can acquire the category of the present position from the map information where the category of each position is stored and the present position information, and the decorrelation distance can then be determined from the acquired category. Alternatively, the in-vehicle wireless communication device can capture the image of the vehicle surroundings, acquire the category of the present position by image analysis, and determine the decorrelation distance from the acquired category. A combination of position information and image information is preferred. The decorrelation time can be obtained by dividing the decorrelation distance by the movement speed of the in-vehicle wireless communication device.

Each in-vehicle wireless communication device performs the sensing repeatedly at time intervals equal to or longer than the first decorrelation time (multipath coherence time), thereby performing a plurality of measurements with mutually decorrelated effects of multipath fading. Thus, the diversity effect is obtained from the plurality of measurements, and the measurement accuracy rises correspondingly to the number of measurements. From the standpoint of measurement accuracy, it is preferred that the sensing interval be equal to or longer than the first decorrelation time and also be as short as possible. However, the measurement interval may be also longer than the first decorrelation time with consideration for communication efficiency.

The in-vehicle wireless communication device performs wireless transmission of a plurality of most recent sensing results to the surroundings with an interval equal to or longer than the second decorrelation time (shadowing decorrelation time). As a result, the channel state can be determined on the basis of the sensing results obtained by a plurality of in-vehicle wireless communication devices. In this case, since the transmission interval of sensing results is set to be equal to or longer than the second decorrelation time, the effect of shadow fading in the measurement results of the in-vehicle wireless communication devices is decorrelated. Therefore, the diversity effect is obtained and the measurement accuracy is increased. Where a plurality of sensing results is transmitted, each sensing result may be transmitted separately, or a result obtained by combining the plurality of sensing results may be transmitted.

When the channel state is determined, any method can be used for determining whether or not a primary user is present from a plurality of sensing results. For example, where the primary user radio wave is detected even for one of a plurality of sensing results, it can be determined that this channel is used by the primary user. The channel for which the primary user radio wave has been detected in the predetermined or larger number of measurements or at a predetermined or higher ratio of measurements, among the plurality of sensing results, can be also determined to be used by the primary user.

It is preferred that the sensing be performed synchronously in all of the in-vehicle wireless communication devices. Thus, it is preferred that all of the in-vehicle wireless communication devices perform the sensing within the sensing period, and all of the in-vehicle wireless communication devices perform the communication within the communication period. In order to realize such a feature, the same decorrelation time should be used in all of the in-vehicle wireless communication devices. In the present invention, it is preferred that the values obtained by dividing the first and second decorrelation distances by the lowest movement speed, from among the movement speeds of the plurality of in-vehicle wireless communication devices, be used as the first and second decorrelation time.

Further, in the notification step in accordance with the present invention, not all of the in-vehicle wireless communication devices have to transmit the sensing results to the surroundings. For example, the in-vehicle wireless communication devices separated from each other by the second decorrelation distance (shadowing decorrelation distance) or a larger distance, from among the plurality of in-vehicle wireless communication devices, may transmit the sensing results to the surroundings. Since the sensing results within the second decorrelation distance are apparently correlated, where the in-vehicle wireless communication devices separated by the second decorrelation distance or a large distance transmit the sensing results, the communication volume can be reduced without decreasing the accuracy.

In order to determine the distance between the in-vehicle wireless communication devices, it is necessary to exchange position information between the in-vehicle wireless communication devices. The exchange of position information may be performed by any system. For example, the in-vehicle wireless communication devices apparently can notify of the position and movement speed thereof by periodic broadcasting. A node transmitting the sensing results may be determined on the basis of the position information on the in-vehicle wireless communication devices. For example, a leading device from the vehicle group constituted by a plurality of in-vehicle wireless communication devices is determined as a transmitting node, and the closest in-vehicle wireless communication device separated from the node determined as the transmitting node by the second decorrelation distance or a larger distance is determined as the next transmitting node. All of the transmitting nodes can be determined by repeating such processing.

Further, all of the in-vehicle wireless communication devices may transmit the sensing results in the notification step in accordance with the present invention, and a channel state may be determined in the determination step by using the sensing results transmitted from some of the in-vehicle wireless communication devices. In this case, it is preferred that a channel state be determined using the sensing results transmitted by the in-vehicle wireless communication devices separated from each other by the second decorrelation distance or a larger distance, from among the plurality of in-vehicle wireless communication devices. Such determination can be executed in the same manner as described above by receiving the notification of position information from the surrounding in-vehicle wireless communication devices.

The present invention can be also understood as relating to a cooperative spectrum sensing method for executing at least some of the abovementioned processing operations. The present invention can be also understood as relating to an in-vehicle wireless communication device including means for executing at least some of the abovementioned processing operations. Further, the present invention can be also understood as relating to a computer program for causing a computer to execute the aforementioned method. The present invention can be configured by combining the abovementioned means and processing operations in a variety of possible combinations.

Advantageous Effects of Invention

According to the present invention, a highly efficient cooperative spectrum sensing can be achieved.

BRIEF DESCRIPTION OF DRAWINGS

FIG. 3 shows an example of a table stored in a decorrelation distance storage unit.

DESCRIPTION OF EMBODIMENTS

<System Overview>

Figure 1:
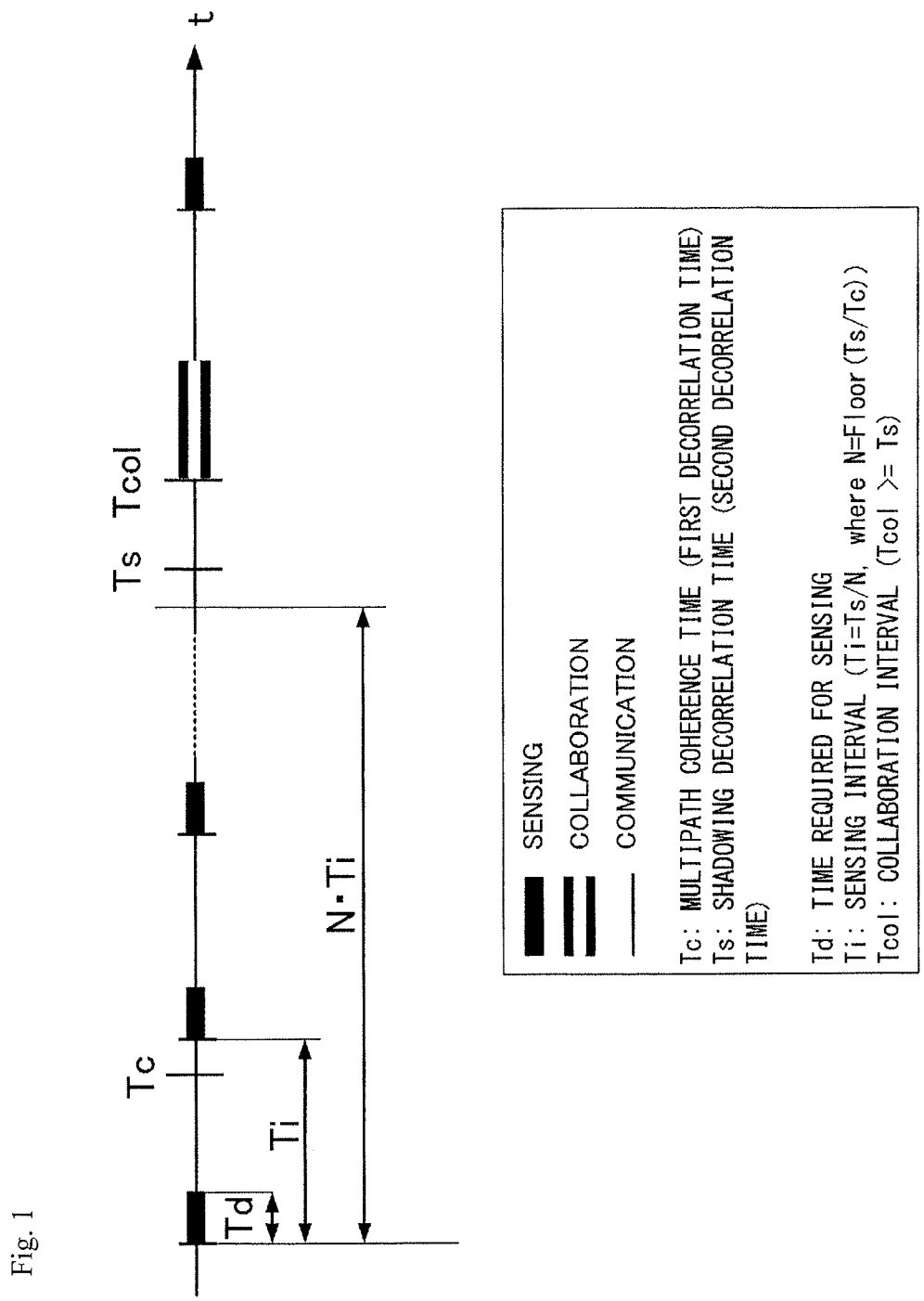
FIG. 1 shows schematically the algorithm of the cooperative spectrum sensing in the present embodiment.

The embodiment of present invention is a wireless communication system (vehicular wireless communication system) constituted by a plurality of in-vehicle wireless communication devices (in-vehicle devices) performing communication by using a white space. The white space, as referred to herein, is a frequency that is not used by a primary user. The in-vehicle device uses, as a secondary user, the white space within a range free of interference with the primary user. Where the in-vehicle device senses a channel and the channel is not used by the primary user, the in-vehicle device performs wireless communication by using this frequency. It is necessary to sense periodically as to where or not the primary user uses the frequency, even during the execution of the wireless communication, and immediately stop the wireless communication at this frequency once the usage of the frequency by the primary user has been sensed. The diversity effect is obtained and sensing accuracy is increased by combining the sensing results obtained in a plurality of cycles by each in-vehicle wireless communication device during the sensing, or by combining the sensing results obtained by a plurality of in-vehicle wireless communication devices.

The measurement accuracy can be expected to increase with the increase in the number of sensing cycles, but when the temporal or positional interval of measurements is small, the plurality of measurements are cross correlated which does not necessarily help to increase the measurement accuracy. Therefore, the suitable sensing algorithm should be used with consideration for such correlation between the measurements.

<Causes of Channel Fluctuations>

In mobile communication, radio waves reach the receiving antenna from a variety of directions. Therefore, where the radio waves are received by a mobile receiver, the reception power greatly changes due to interference of radio waves. This phenomenon is called "fading". Several factors can cause the fading, but comparatively strong among them are multipath fading and shadow fading. The multipath fading is a fluctuation occurring because radio waves that have reached the vicinity of the receiving antenna are reflected and diffracted by closely located reflecting objects (buildings or trees) and are received with a difference in time by a plurality of paths (multipath reception). The multipath fading is a phenomenon occurring on a comparatively small scale. The shadow fading is a fluctuation occurring because radio waves are blocked by buildings and terrain relief. The shadow fading is a phenomenon occurring on a comparatively large scale.

The scale of the multipath fading and shadow fading is explained herein from the standpoint of decorrelation time and decorrelation distance. The decorrelation time is a time in which measurement results can be expected to be decorrelated where the measurements are performed at timings separated by the time interval thereof. The decorrelation distance is a distance at which measurement results can be expected to be decorrelated where the measurements are performed at positions separated by the distance interval thereof when performing a plurality of spectrum sensing operations. More specifically, the decorrelation time (distance) can be defined as a time (distance) in which the correlation coefficient between the measurements is equal to or less than a threshold (typically, 0.5).

The fading scale differs depending on the surrounding environment and frequency. In the example explained herein, an urban area with a large number of multistoried buildings and a frequency of 700 MHz are assumed. Where a Rayleigh model is used, the decorrelation time (first decorrelation time, multipath coherence time) Tc of multipath fading can be represented using the maximum Doppler shift fm by the following equation. Here, fc stands for a channel carrier frequency, v—the movement speed of the vehicle (in-vehicle wireless communication device), c—speed of light.

$$T_c = \frac{0.423}{f_m}$$ [Math. 1]

$$f_m = \frac{v}{c} f_c$$

Under the conditions of fc=700 MHz and v=40 km/h, the multipath coherence time is about 16 ms, and the multipath coherence distance Dc (=v Tc) is about 20 cm. Where the movement speed v=80 km/h, the multipath coherence time Tc is about 8 ms and the multipath coherence distance Dc is about 40 cm.

According to various models and actual measurement results, the decorrelation distance of shadow fading (second decorrelation distance, shadowing decorrelation distance) Ds is about 20 m under the abovementioned conditions. Therefore, where the movement speed is v=40 km/h, the shadowing decorrelation time Ts (=Ds/v) is about 1800 ms. Where the movement speed v=80 km/h, the shadowing decorrelation time Ts is about 900 ms.

Summarizing the abovementioned results, the decorrelation time in which the effects of multipath fading and shadow fading are decorrelated changes in the following manner according to the movement speed.

TABLE 1

| Movement speed (km/h) | Shadowing decorrelation time Ts (ms) | Multipath decorrelation time Tc (ms) |
|---|---|---|
| 40 | 1800 | 16.3 |
| 80 | 900 | 8.2 |

Thus, the phenomenon scale differs significantly between the multipath fading and shadow fading.

<Summary of Cooperative Spectrum Sensing Algorithm>

The present invention provides an efficient cooperative spectrum sensing algorithm that takes into account the effects of both the multipath fading and the shadow fading, which differ in scale as described hereinabove. The cooperative sensing algorithm is explained below.

The present invention uses time diversity for handling the small-scale multipath fading and spatial diversity for handling the shadow fading which is of a larger scale.

More specifically, repeated sensing is performed with a time interval equal to or longer than the multipath coherence time Tc (about 10 ms) in each in-vehicle device. As a result, measurement results are obtained in which the effect of multipath fading is decorrelated. Therefore, the time diversity effect is obtained. The sensing performed in each in-vehicle device is referred to hereinbelow as local sensing.

A single sensing result is then obtained in a vehicle group by combining the local sensing results with a time interval equal to or longer than the shadowing decorrelation time Ts (about 1000 ms). Used in this case are only the local sensing results of the in-vehicle devices that are separated by the distance interval equal to or greater than the shadowing decorrelation distance Ds. As a result, an effective spatial diversity effect can be obtained while inhibiting the communication volume required for notifying of the local sensing results. The notification of the local sensing results and the determination of a channel state based thereon are also called hereinbelow as collaborative processing or simply collaboration.

The sensing algorithm is explained hereinbelow in greater detail with reference to FIG. 1. FIG. 1 shows the timing at which the local sensing is implemented and the timing at which the collaboration is implemented.

The duration Td of time in which the local sensing is executed is substantially shorter than the multipath coherence time Tc (Td<<Tc). As a result, the channel during the sensing period is affected by time-invariant multipath fading and can be assumed to be in a stationary state. Since no communication is performed in the sensing period, this period is also referred to as a no-communication period (Quiet Period).

The execution time interval Ti of local sensing in the in-vehicle device is greater than the multipath coherence time Tc (Ti>=Tc). In this case, the value to be taken for the sensing interval Ti may be determined, as appropriate, according to the sensing accuracy necessary in the system or the allowed overhead. Where the sensing interval Ti is taken to be equal to the multipath coherence time Tc (Ti=Tc), the communication throughput decreases, but the sensing can be performed with better accuracy. The sensing interval Ti is preferably such that the sensing is performed from several to dozens of times or more over the shadowing decorrelation time Ts, and also such as not to be very long (for example, within 100 ms).

Where the sensing interval is taken as Ti, a total of N local sensing operations can be executed over the shadowing decorrelation time Ts. In this case, N is an integer represented by the following Floor function.

$$N = \lfloor T_s/T_i \rfloor$$ [Math.2]

The in-vehicle device combines the N sensing results to determine the channel state within this period.

The collaboration is executed at time intervals Tcol. Thus, the channel state determination is performed as a vehicle group on the basis of local sensing results in a plurality of in-vehicle devices at time intervals Tcol. The collaboration interval Tcol is equal to or longer than the shadowing decorrelation time Ts (Tcol>=Ts). In this case, a value to be taken for the collaboration interval Tcol may be determined, as appropriate, according to the sensing accuracy required in the system and the required determination frequency of the channel state. Where the collaboration interval is taken to be equal to the shadowing decorrelation time Ts (Tcol=Ts), the communication throughput decreases, but more frequent sensing is enabled and the usage start by the primary user can be immediately sensed. The upper limit value of Tcol is such (for example, 1 min) as to satisfy required channel state determination frequency necessary for the system.

The channel state, that is, whether or not the channel is used by the primary user, is determined at collaboration intervals Tcol. The determination results are conveyed to a plurality of in-vehicle devices and used to determine whether or not to perform the communication as a secondary user by using the channel.

<Device Configuration>

Figure 2:
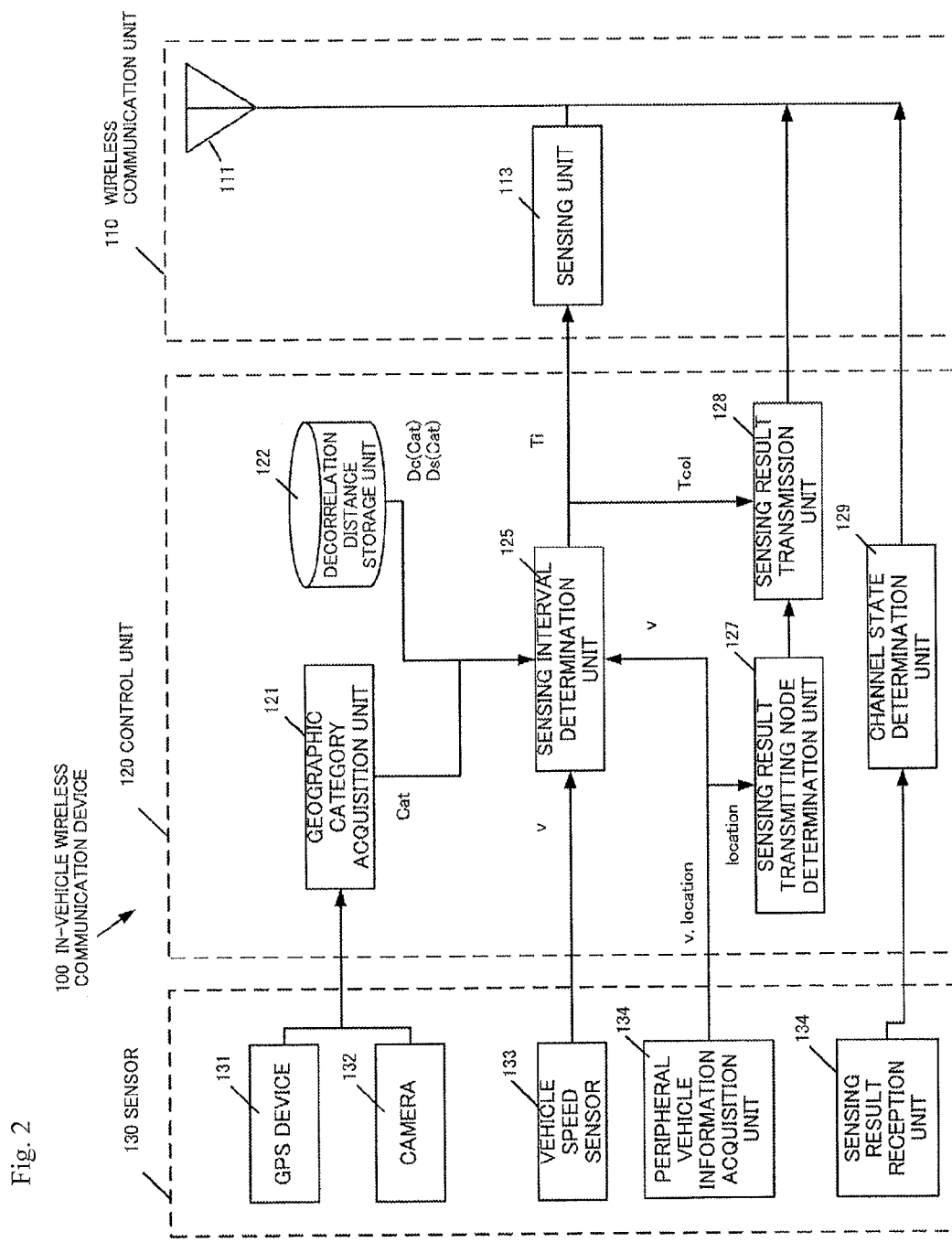
FIG. 2 is a functional block diagram of the in-vehicle wireless communication device (in-vehicle terminal) according to the present embodiment.

FIG. 2 shows the functional block diagram of an in-vehicle wireless communication device (in-vehicle device) 100 according to the present embodiment. The in-vehicle device 100 has a wireless communication unit 110, a control unit 120, and a sensor 130. The control unit 120 controls the execution of sensing on the basis of information acquired from the sensor 130. The wireless communication unit 110 executes the local sensing and collaboration at the intervals determined by the control unit 120. The control unit 120 may be implemented by the execution of a program by a CPU or a DSP, or may be implemented by a dedicated hardware circuit.

The sensor 130 includes a GPS device 131, a camera 132, a vehicle speed sensor 133, a peripheral vehicle information acquisition unit 134, and a sensing result reception unit 135. The GPS device 131 is a functional unit acquiring the present position of the vehicle on the basis of signals from a GPS satellite. In order to increase the accuracy of position information acquisition, it is preferred that correction using a gyroscope or map information be performed. The position information acquired from the GPS device 131 is used to determine the location at which the vehicle is presently positioned. The camera 132 captures the vehicle surroundings. The image captured by the camera 132 is subjected to image recognition processing and used to determine the location at which the vehicle is presently positioned. The vehicle speed sensor 133 senses the movement speed of the vehicle. The peripheral vehicle information acquisition unit 134 is a functional unit acquiring information such as the position information, movement speed, and movement direction from the surrounding in-vehicle devices by wireless communication. The sensing result reception unit 135 is a functional unit acquiring the results of local sensing from the surrounding in-vehicle devices. The peripheral vehicle information acquisition unit 134 and the sensing result reception unit 135 acquire those types of information through the wireless communication unit 110.

The control unit 120 has a geographic category acquisition unit 121, a decorrelation distance storage unit 122, a sensing interval determination unit 125, a sensing result transmitting node determination unit 127, a sensing result transmission unit 128, and a channel state determination unit 129.

The geographic category acquisition unit 121 is a functional unit acquiring the category (class) of the location where the vehicle is present on the basis of information acquired from the GPS device 131 or the camera 132. The geographic category acquisition unit 121 stores map information including a category for each location, and acquires the category of the present location on the basis of position information acquired from the GPS device 131. The geographic category acquisition unit 121 may also acquire the category of the present location by performing the image recognition processing such as pattern recognition with respect to the image captured by the camera 132.

In this case, the reference for each category of location can be designed as appropriate. However, it is preferred that classification be used such that the decorrelation distance of multipath fading and shadow fading be about the same in a single category. Where the geographic category is determined based only on position information, the usage of the classification into urban areas, suburban areas, and rural areas can be considered. Alternatively, in a more detailed classification, categories such as multistoried building zone, highway zone, mountain zone, and plain zone may be used. When the geographic category acquisition unit 121 acquires a geographic category by analyzing the image obtained with the camera 132, the category is acquired on the basis of the surrounding landscape. For example, where a large number of multistoried buildings are present in the image, the area is classified into the multistoried building zone, and where the surroundings are open, the area is classified as the plain area. Where the camera 132 is used, detailed categorization can be performed even when the detailed category class has not been stored in advance for each location. A classification such that changes with time such as traffic congestion can be also used for the categories.

The decorrelation distance storage unit 122 stores the decorrelation distance of multipath fading and shadow fading for each category of location. The decorrelation distance, as referred to herein, is a distance at which fluctuations caused by multipath fading or shadow fading are assumed to be decorrelated where an interval equal to this distance is set. In the present embodiment, the decorrelation distance is defined in the following manner. Thus, the decorrelation distance is a distance such that the normalized autocorrelation of the measurement results obtained when performing measurements (simultaneously) at positions separated by this or a larger distance is equal to or less than 0.5.

The decorrelation distance stored in the decorrelation distance storage unit 122 may be determined by the presently available technique. For example, an appropriate model can be created for each category of location to calculate the decorrelation distance. Alternatively, the decorrelation distance for each category of location can be determined on the basis of actual measurements.

FIG. 3 shows an example of the table of the decorrelation distance storage unit 122. As shown in FIG. 3, the decorrelation distance Dc of multipath fading and the decorrelation distance Ds of shadow fading are stored for each category of location. Three large classification groups, namely, urban area, suburban area, and rural area, and finer classification groups are used for the geographic categories.

The sensing interval determination unit 125 determines the execution interval Ti of the local sensing performed by the sensing unit 113 and the execution interval Tcol of the collaboration executed by the sensing result transmission unit 128. The local sensing interval Ti, as referred to herein, is an interval from after one spectrum sensing has been performed till the next spectrum sensing is performed. The local sensing interval Ti can be determined as Ti=Dc/v, where Dc is the multipath coherence distance at the present position and v is the movement speed of the in-vehicle device. The execution interval. Tcol of collaboration, as referred to herein, is an interval from after one collaboration has been performed till the next collaboration is performed. The execution interval Tcol of collaboration can be determined as Tcol=Ds/v, where Ds is the shadowing decorrelation distance at the present position and v is the movement speed of the in-vehicle device.

Here, the period in which the local sensing is performed (that is, the transmission stop period) and the period in which the collaboration is performed are preferably the same in all of the in-vehicle devices. Thus, the local sensing interval Ti and the collaboration interval Tcol preferably have the same values in all of the in-vehicle devices. In the present embodiment, the local sensing interval Ti and the collaboration interval Tcol are determined on the basis of the movement speed of the slowest in-vehicle device from among a plurality of in-vehicle devices. For this purpose, the slowest speed, from among the surrounding movement speeds (vehicle speeds) acquired from the peripheral vehicle information acquisition unit 134, is taken as v, the local sensing interval Ti is determined as Ti=Dc/v, and the collaboration interval Tcol is determined as Tcol=Ds/v. The local sensing interval Ti and the collaboration interval Tcol may be determined in each vehicle, or the local sensing interval Ti and the collaboration interval Tcol may be determined in a certain specific in-vehicle device (for example, an in-vehicle device (control node) controlling the group of vehicles) and other in-vehicle devices may be notified of the determined intervals. In this case, it is preferred that the measurement results on the location categories acquired by each in-vehicle device be collected in the specific in-vehicle device and the location category be determined in this in-vehicle device.

The sensing result transmitting node determination unit 127 is a functional unit determining a node transmitting the local sensing result in collaboration. As mentioned hereinabove, effective spatial diversity can be realized by separating the nodes transmitting the local sensing result from each other by the shadowing decorrelation distance Ds or a larger distance. The sensing result transmitting node determination unit 127 acquires position information on each vehicle from the peripheral vehicle information acquisition unit 134 in order to determine the position of each in-vehicle device. The leading in-vehicle device, from among the plurality of in-vehicle devices (vehicle group), is initially determined as a transmitting node. Then, the closest in-vehicle device, from among the in-vehicle devices separated by the sensing decorrelation distance Ds or a larger distance from the node that has already been determined as the transmitting node, is determined as the transmitting node. The nodes transmitting the local sensing results can be determined by repeating such determination processing till the very last in-vehicle device is reached. In the explanation above, the leading vehicle is initially determined as the transmitting node and then other transmitting nodes are determined in the rearward direction, but it is also possible to determine the very last vehicle as the transmitting node and determine other transmitting nodes in the forward direction, or determine any vehicle (for example, a control node) in the vehicle group as the transmitting node and then determine other transmitting nodes in the forward and rearward directions.

The sensing result transmission unit 128 is a functional unit transmitting the plurality of most recent local sensing results at the collaboration execution timing. The plurality of local sensing results can be transmitted in any representation. For example, it is possible to transmit the number of times the primary user has been sensed in the plurality of sensing operations, or to transmit whether or not the primary user is present on the basis of the plurality of sensing operations.

The channel state determination unit 129 determines the state of the channel on the basis of the local sensing results transmitted from the surrounding in-vehicle devices. The channel state may be determined in any manner from the plurality of local sensing results. For example, where each individual sensing is a hard determination, an OR base, an AND base, and a threshold base (for example, decision by a majority) may be used for the local sensing results. Meanwhile, where each individual sensing is a soft determination, selection combining, equal gain combining (EGC), maximum ratio combining (MRC), and likelihood ratio test (LRT) may be used for the local sensing results.

The channel state determination unit 129 transmits the determination result to other in-vehicle devices by using the wireless communication unit 110. When the channel is used by the primary user, the use thereof by the secondary user should be immediately stopped. It is not always necessary that the channel state determination unit 129 be provided in all of the in-vehicle devices. Thus, it is sufficient that such unit be provided only in the in-vehicle device that performs the channel state determination processing. Conversely, the channel state determination unit 129 may be provided in all of the in-vehicle devices. In this case, it is not necessary to transmit the channel state determination result to other in-vehicle devices.

The sensing unit 113 performs, at the timing that has been set by the control unit 120, the sensing as to whether or not the primary user is using the channel. Any sensing algorithm can be used, and whether or not the frequency is being used can be determined by energy detection, wavelet decomposition technique, pilot tone sensing, eigenvalue based sensing, feature detection, and a matched filter method according to the wireless communication system used for detection.

The sensing unit 113 performs a plurality of sensing operations as the collaboration is performed. The determination of each sensing may be hard or soft. The result of local sensing based on the plurality of sensing results also may be a hard determination or a soft determination. When a hard determination is used, the presence of the primary user is determined by the OR base, AND base, and threshold base. In the case of soft determination, the probability of the primary user being present is determined. In the case of soft determination, it is preferred that the reliability of the determination be further added on the basis of the reception signal intensity or SNR.

<Method>

The cooperative sensing method performed by the in-vehicle wireless communication device 100 according to the present embodiment will be explained below with reference to the drawings. The explanation is based on the assumption that the decorrelation distance for each category of location has been stored in advance in the decorrelation distance storage unit 122.

(Sensing Interval Determination Processing)

Figure 4:
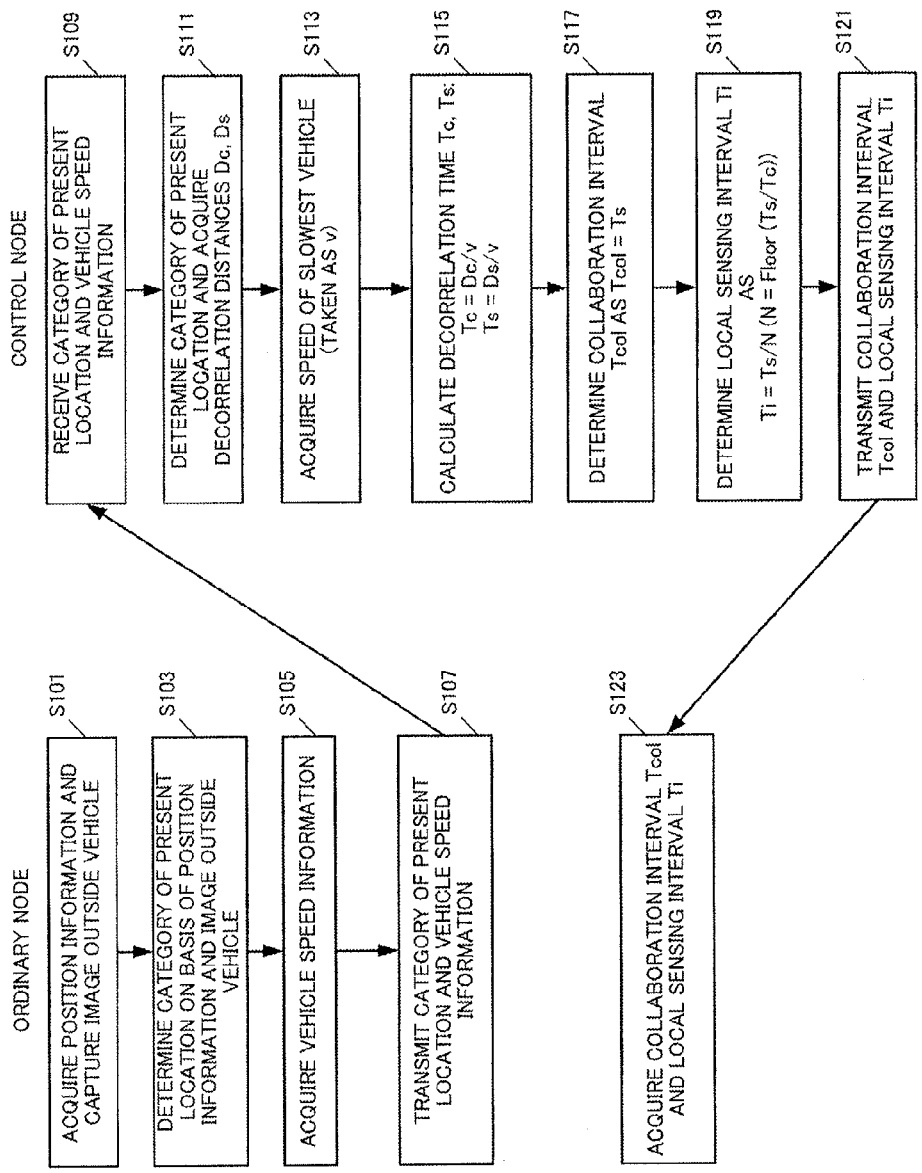
FIG. 4 is a flowchart showing the flow of sensing interval determination processing performed by the in-vehicle wireless communication device.

FIG. 4 is a flowchart showing the flow of sensing interval determination processing. In the system explained herein, one of a plurality of in-vehicle devices determines the sensing interval and notifies other in-vehicle devices of the sensing interval. The in-vehicle device determining the sensing interval is called a control node, and other in-vehicle devices are called ordinary nodes. The control node may be the same as or different from the node performing the vehicle group control.

The ordinary nodes acquire position information from each GPS device 131 and capture the image of vehicle surroundings from the camera 132 (S101). The geographic category acquisition unit 121 determines the category of the present location from the acquired position information and image of vehicle surroundings (S103). The movement speed of the vehicle (vehicle speed) is acquired from the vehicle speed sensor 133 (S105). The ordinary nodes transmit the category of the present location, which has been determined in step S103, and the vehicle speed, which has been acquired in step S105, to the control node (S107).

The control node acquires, through the peripheral vehicle information acquisition unit 134, the location category and vehicle speed transmitted from the ordinary nodes (S109). The sensing interval determination unit 125 of the control node determines the category of the present location on the basis of the location category transmitted from the ordinary nodes and the location category acquired from the geographic category acquisition unit 121 of the host node. The multipath coherence distance Dc and the shadowing decorrelation distance Ds corresponding to determined categories are acquired from the decorrelation distance storage unit 122 (S111). For example, a method for determining the category according to a decision by a majority can be considered for determining the geographic category.

The sensing interval determination unit 125 of the control node acquires the lowest vehicle speed (this speed is denoted by v) from among the vehicle speed transmitted from the ordinary nodes and the vehicle speed of the host node (S113). The decorrelation time of the multipath fading and shadow fading is then calculated from the vehicle speed v and the decorrelation distance of the multipath fading and shadow fading (S115). Thus, the multipath coherence time Tc is determined as Tc=Dc/v, and the shadowing decorrelation time Ds is determined as Ds=Ts/v.

The sensing interval determination unit 125 determines the collaboration interval Tcol as the shadowing decorrelation time Ts (S117). However, it is not always necessary that Tcol be equal to Ts, and a longer time may be also used. The upper limit value of Tcol is determined on the basis of time at which channel determination should be performed. For example, where it is necessary to perform channel determination at least once per 1 min, the upper limit value of Tcol is 1 min (60 sec).

The sensing interval determination unit 125 then determines the local sensing interval Ti on the basis of the collaboration interval Tcol. Thus, the integer N is taken as N=Floor (Ts/Tc), and the local sensing interval is determined as Ti=Tcol/N. Here, Floor is the floor function. With such a determination, the condition of Ti>=Ts is fulfilled.

The sensing interval determination unit 125 of the control node transmits the collaboration interval Tcol and the local sensing interval Ti, which have been determined in the above-described manner, to the surrounding nodes (S121). The ordinary nodes receive the collaboration interval Tcol and the local sensing interval Ti from the control node and implement thereafter the sensing processing by using those values (S123).

The sensing interval determination processing shown in FIG. 4 may be performed at any timing. Since the surrounding environment changes with the movement of the vehicle group and the passage of time, it is preferred that the sensing interval determination processing be performed periodically. Further, the control node may also determine the present location category only from the position information on the captured image acquired by the host node, without using the transmission of position information and captured image from the ordinary nodes to the control node.

(Transmitting Node Determination Processing)

Figure 5:
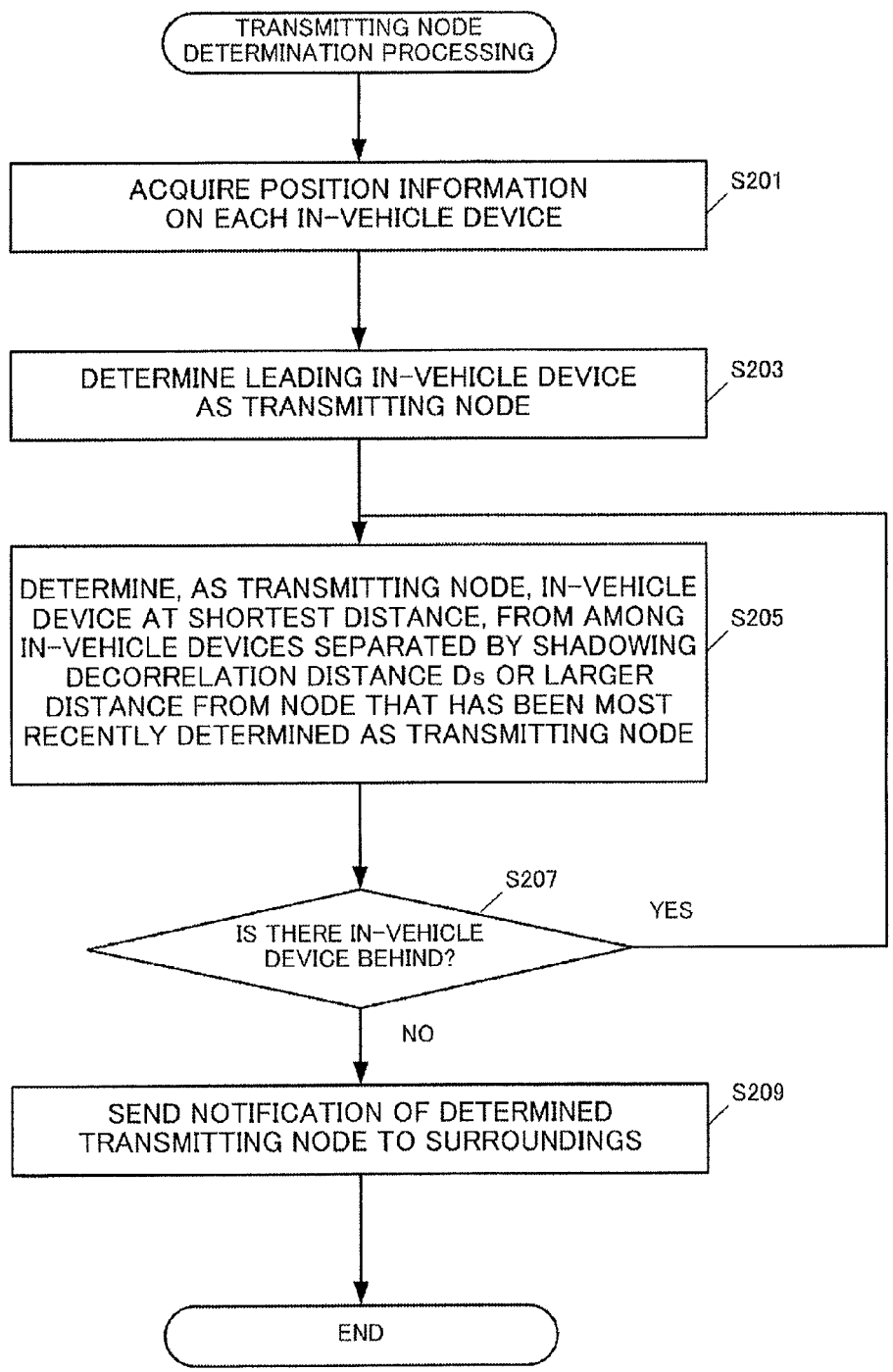
FIG. 5 is a flowchart showing the flow of transmitting node determination processing performed by the in-vehicle wireless communication device.

The processing of determining the node transmitting the local sensing results to the surroundings (transmitting node determination processing) will be explained below with reference to FIG. 5. The control node acquires through the peripheral vehicle information acquisition unit 134 the position information transmitted from the ordinary nodes (S201). As a result, the positional relationship of the vehicles constituted by the ordinary nodes and control node can be determined.

Figure 6:
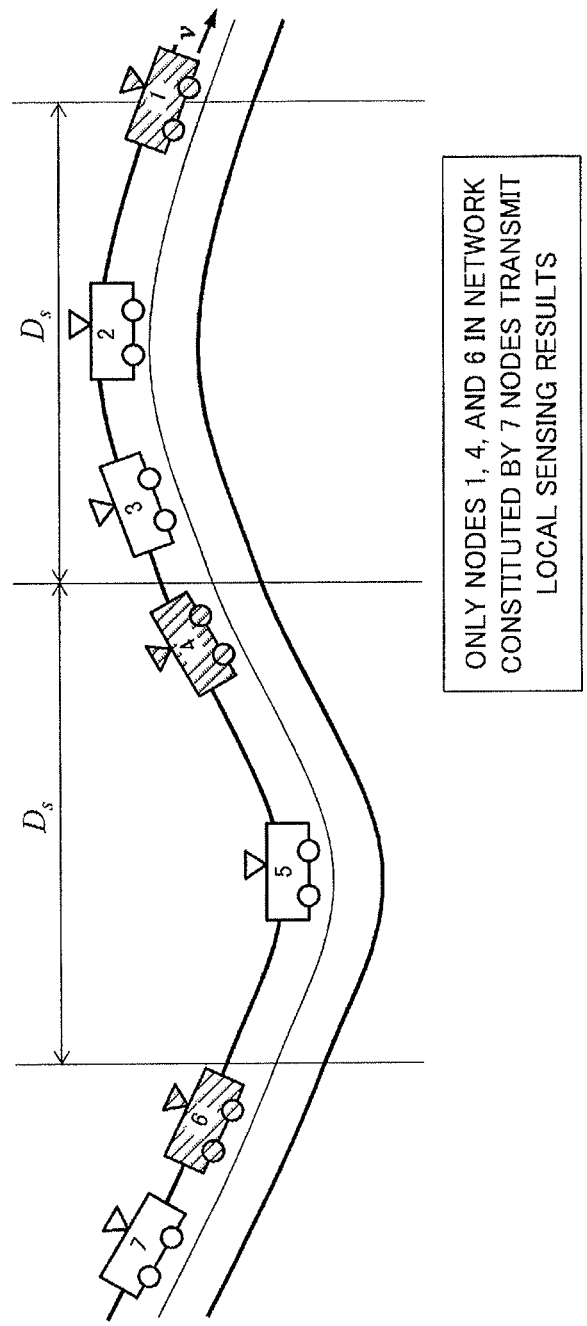
FIG. 6 shows an example of the in-vehicle wireless communication device determined as a transmitting node.

The sensing result transmitting node determination unit 127 initially determines the in-vehicle device positioned in the leading vehicle of the vehicle group as the transmitting node (S203). Then, the in-vehicle device at the shortest distance, from among the in-vehicle devices positioned at the shadowing decorrelation distance Ds or a larger distance behind the in-vehicle device, which has been determined as the transmitting node, is determined as the transmitting node (S205). Where an in-vehicle device is present behind this node (S207—YES), the processing of step S204 is repeatedly executed. Once the transmitting node determination processing has been completed with respect to all of the vehicles of the group, the control node notifies the surrounding in-vehicle devices of the determined transmitting nodes (S209).

Where the transmitting nodes are thus determined, the transmitting node interval becomes at least equal to or greater than the shadowing decorrelation distance Ds, as shown in FIG. 6.

The abovementioned transmitting node determination processing may be performed at any timing. The positional relationship in the vehicle group changes at all times. Therefore, it is preferred that the transmitting node determination processing be performed periodically.

(Local Sensing Processing)

Figure 7:
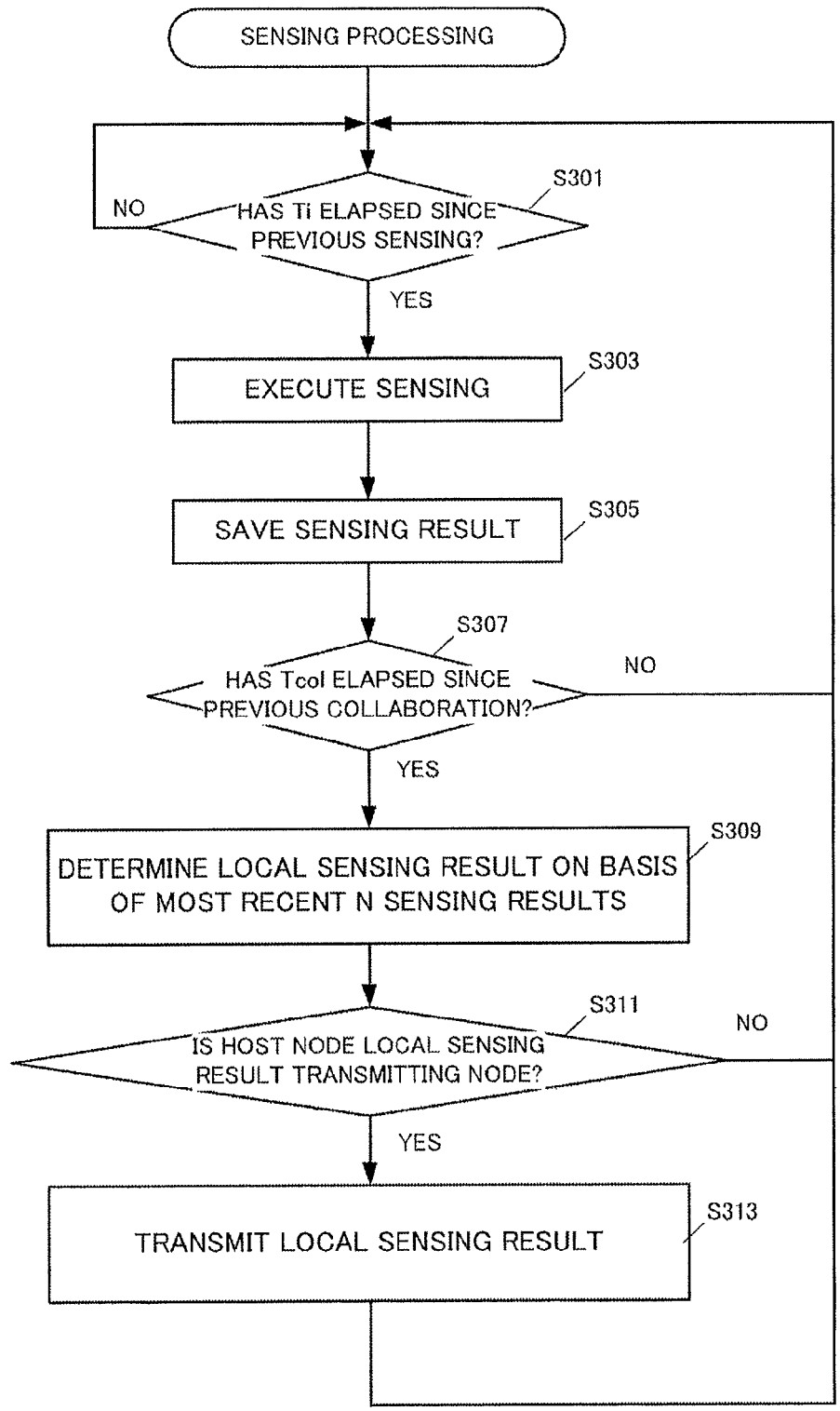
FIG. 7 is a flowchart showing the flow of sensing processing performed by the in-vehicle wireless communication device.

The local sensing processing implemented by each in-vehicle device will be explained below with reference to FIG. 7. Initially, where the local sensing interval Ti has elapsed since the previous sensing (S301—YES), the sensing unit 113 executes the local sensing (S303). Meanwhile, where the local sensing interval Ti has not elapsed since the previous sensing (S301—NO), communication is executed, provided that the primary user performs no communication (this processing is not shown in the flowchart). The local sensing result is temporarily saved in the memory (S305). In this case, it is determined whether the collaboration interval Tcol has elapsed since the previous collaboration (S307). Where the collaboration interval has not elapsed (S307—NO), the processing flow returns to step S301. Where the collaboration interval Tcol has elapsed since the previous collaboration (S307—YES), the result of local sensing is determined on the basis of the N most recent (N=Floor (Ts/Tc)) sensing results. Any local sensing result may be derived from the N sensing results. For example, where the primary user has been sensed a predetermined or larger number of times (N times), the channel can be determined to be used by the primary user. When the host node is designated as a local sensing result transmitting node (S311—YES), the local sensing result is wireless transmitted (S313).

Since the node transmitting the local sensing result is only the node designated as the transmitting node, local sensing may be also executed only when the host node is designated as the transmitting node.

(Channel State Determination Processing)

Figure 8:
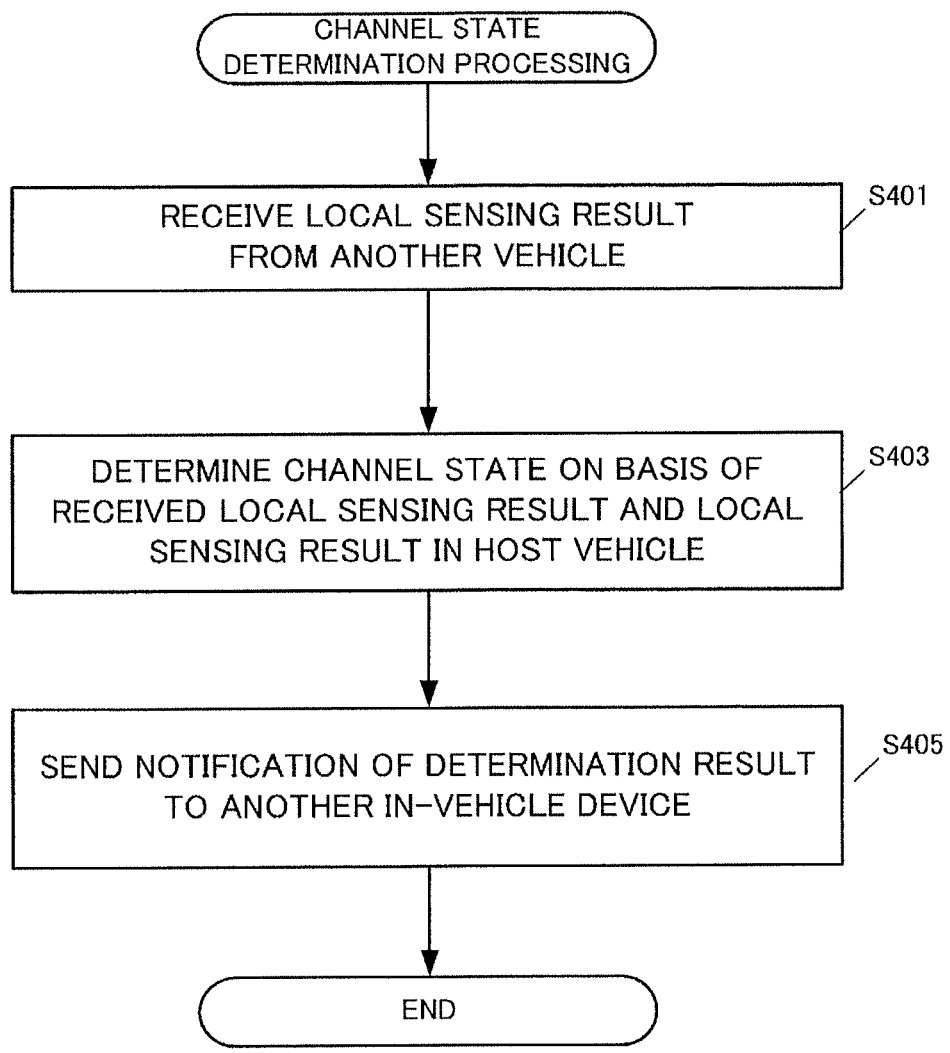
FIG. 8 is a flowchart showing the flow of channel state determination processing performed by the in-vehicle wireless communication device.

The channel state determination processing performed on the basis of a plurality of local sensing results will be explained hereinbelow with reference to FIG. 8. The processing may be performed by any in-vehicle device in the vehicle group. For example, this processing is executed by the control node. Alternatively, the channel state determination processing may be executed by a device other than the in-vehicle wireless communication device, such as a roadside unit.

The channel state determination unit 129 receives the local sensing results from the local sensing result transmitting node through the sensing result reception unit 135 (S401). The channel state is then determined by combining the plurality of received local sensing results and the local sensing result in the host node (S403). Any determination criterion may be used. For example, when the presence of the primary user has been sensed in a predetermined or larger number, among the plurality of local sensing results, it is determined that the channel is used by the primary user. The channel state determination unit 129 transmits the abovementioned determination results to the surrounding vehicles through the wireless communication unit 110 (S405). Where the primary user has started the communication using the channel, the in-vehicle devices are immediately notified thereof and the use of the channel by the in-vehicle devices as the secondary users is immediately stopped.

<Effects>

According to the present embodiment, when a plurality of in-vehicle devices performs cooperative spectrum sensing, temporal diversity and spatial diversity are effectively used. Therefore, accurate spectrum sensing can be performed while inhibiting the number of sensing cycles and the number of transmission cycles of sensing results.

Variation Examples

In the explanation above, the node that will transmit the local sensing result is determined, and only the determined node is made to transmit the local sensing result. However, all of the nodes may transmit the local sensing results to determine the node from which the local sensing results are to be used in the node determining the channel state. In this case, the sensing result transmitting node determination unit 127 and the transmitting node determination processing (FIG. 5) are unnecessary, and the channel state determination unit 129 instead performs the following processing.

Figure 9:
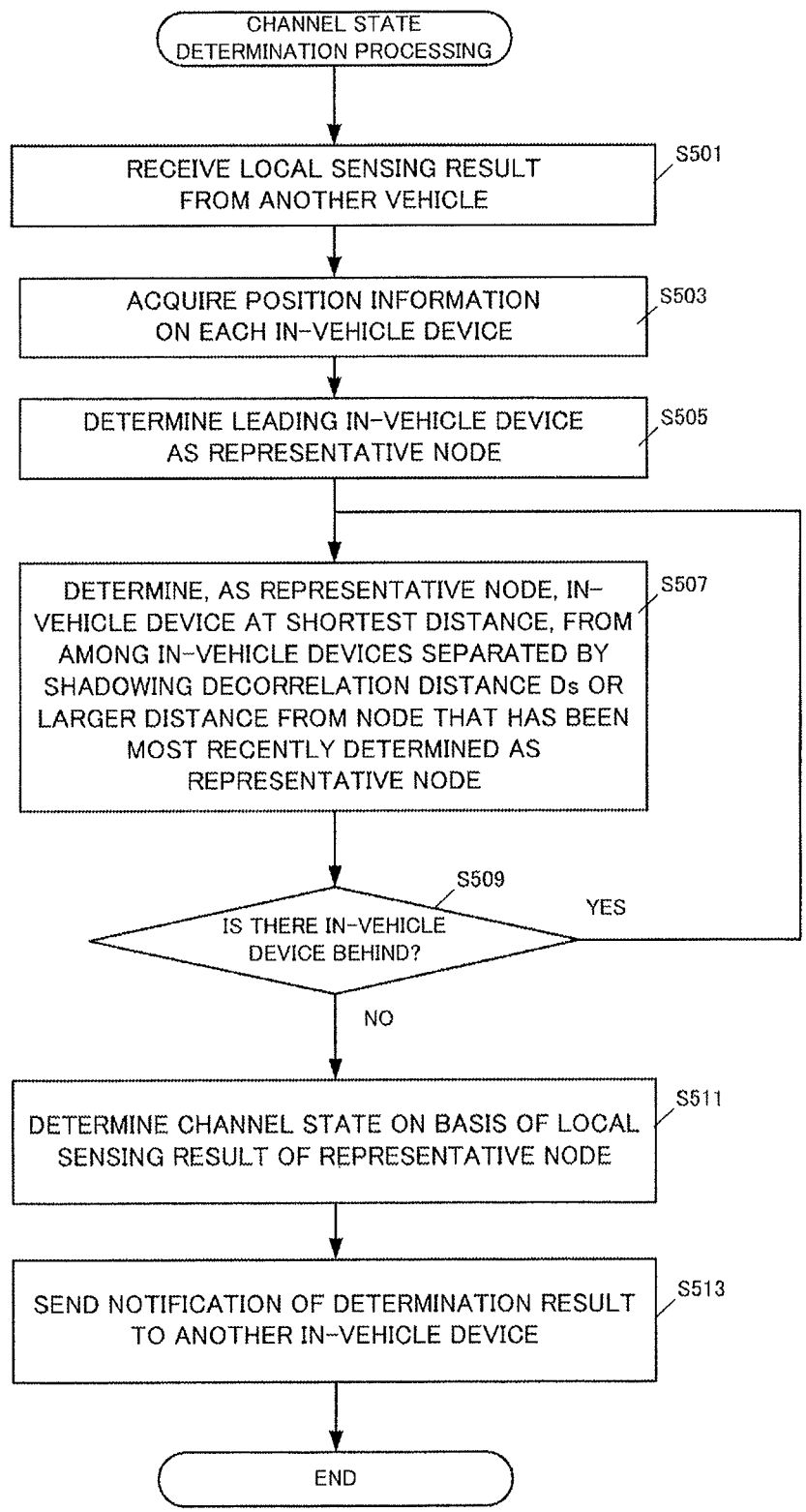
FIG. 9 is a flowchart showing the flow representing a variation example of channel state determination processing performed by the in-vehicle wireless communication device.

The processing performed by the channel state determination unit 129 in the variation example will be explained below with reference to the flowchart shown in FIG. 9. First, the channel state determination unit 129 receives the local sensing results from each in-vehicle device (S501). Then, position information on each in-vehicle device is acquired (S503). The local sensing results and position information may be transmitted independently, but it is preferred that they be transmitted at the same time. Since the positional relationship of the in-vehicle devices can be determined on the basis of the position information, the channel state determination unit 129 decides to determine the channel state by using the local sensing result of the leading in-vehicle device (S505). The in-vehicle device that uses the local sensing results for channel state determination is referred to herein as a representative node. Then, the channel state determination unit 129 determines as a representative node the in-vehicle devices at the shortest distance, from among the in-vehicle devices positioned at a shadowing decorrelation distance Ds or a larger distance behind the in-vehicle device that has been determined as the transmitting node (S507). The processing of step S507 is repeatedly executed as long as the in-vehicle devices are present behind this node (S509—YES). Once the representative node determination processing has been completed with respect to the entire vehicle group, the channel state is determined on the basis of the local sensing results of the representative nodes (S511), and the determination result is transmitted to the surrounding in-vehicle devices (S513).

In the representative node determination, the very last vehicle may be determined as the representative node and other representative nodes may be determined in the forward direction, or any vehicle (for example, a control node) in the vehicle group may be determined as the representative node and other representative nodes may be determined in the forward and rearward directions.

In this way, the channel state can be determined using a plurality of decorrelated sensing results, and therefore, the determination accuracy is increased. Further, good efficiency is obtained when the processing of determining the local sensing result transmitting node and the processing of notifying thereof can be omitted.

REFERENCE SIGNS LIST

100 in-vehicle wireless communication device
110 wireless communication unit
113 sensing unit
120 control unit
121 geographic category acquisition unit
122 decorrelation distance storage unit
125 sensing interval determination unit
127 sensing result transmitting node determination unit
128 sensing result transmission unit
129 channel state determination unit
130 sensor
131 GPS device
132 camera
133 vehicle speed sensor
134 peripheral vehicle information acquisition unit
135 sensing result reception unit

The invention claimed is:

1. A cooperative spectrum sensing method performed by a plurality of in-vehicle wireless communication devices, the method comprising:

a decorrelation time acquisition step in which each in-vehicle wireless communication device acquires a first decorrelation time, which is a time interval in which channel fluctuations resulting from multipath fading are decorrelated, and a second decorrelation time, which is a time interval in which channel fluctuations resulting from shadow fading are decorrelated;

a sensing step in which each in-vehicle wireless communication device repeatedly performs sensing at a time interval equal to or longer than the first decorrelation time;

a notification step in which each in-vehicle wireless communication device performs wireless transmission of a plurality of most recent sensing results at a time interval equal to or longer than the second decorrelation time; and a determination step in which at least any of the plurality of in-vehicle wireless communication devices determines a state of a channel on the basis of the plurality of sensing results transmitted from the plurality of in-vehicle wireless communication devices.

2. The cooperative spectrum sensing method according to claim 1, wherein
the sensing in the sensing step is performed synchronously by the plurality of in-vehicle wireless communication devices.

3. The cooperative spectrum sensing method according to claim 2, further comprising
a decorrelation distance acquisition step for acquiring a first decorrelation distance, which is a distance at which channel fluctuations resulting from multipath fading are decorrelated, and a second decorrelation distance, which is a distance at which channel fluctuations resulting from shadow fading are decorrelated, wherein
in the decorrelation distance acquisition step, the first decorrelation time and the second decorrelation time are calculated by dividing the acquired first decorrelation distance and second decorrelation distance by the slowest movement speed among movement speeds of the plurality of in-vehicle wireless communication devices.

4. The cooperative spectrum sensing method according to claim 3, further comprising:
a storage step for storing the first decorrelation distance and the second decorrelation distance for each category of location; and
an environment recognition step for acquiring position information on the in-vehicle wireless communication device or a surrounding image thereof and determining a category of the location where the in-vehicle wireless communication device is positioned on the basis of the acquired position information or surrounding image, wherein
in the decorrelation distance acquisition step, the first decorrelation distance and the second decorrelation distance at the location where the in-vehicle wireless communication device is positioned are acquired on the basis of the category of the location recognized in the environment recognition step and the first decorrelation distance and the second decorrelation distance for each category of locations stored in the storage step.

5. The cooperative spectrum sensing method according to claim 1, wherein in the notification step, the sensing results are transmitted from in-vehicle wireless communication devices which are mutually separated by the second decorrelation distance or a larger distance, among the plurality of in-vehicle wireless communication devices.

6. The cooperative spectrum sensing method according to claim 5, further comprising:
   a position information notification step for notifying the surroundings of position information on the in-vehicle wireless communication devices; and
   a transmitting node determination step for determining an in-vehicle wireless communication device transmitting the sensing result in the notification step on the basis of position information on the plurality of in-vehicle wireless communication devices notified of in the position information notification step.

7. The cooperative spectrum sensing method according to claim 6, wherein
   the transmitting node determination step involves
   determining a leading in-vehicle wireless communication device, from among the plurality of in-vehicle wireless communication devices, as the in-vehicle wireless communication device transmitting the sensing result, and
   repeatedly determining the closest in-vehicle wireless communication device, which is separated by the second decorrelation distance or a larger distance from the in-vehicle wireless communication device determined to transmit the sensing result, as the in-vehicle wireless communication device transmitting the sensing result.

8. The cooperative spectrum sensing method according to claim 1, wherein
   in the notification step, all of the plurality of in-vehicle wireless communication devices transmit the sensing result, and
   in the determination step, the channel state is determined using the sensing results transmitted from in-vehicle wireless communication devices separated from each other by the second decorrelation distance or a larger distance, from among the plurality of in-vehicle wireless communication devices.

9. The cooperative spectrum sensing method according to claim 8, further comprising:
   a position information notification step for notifying the surroundings of position information on the in-vehicle wireless communication devices, wherein
   in the determination step, the sensing result of which in-vehicle wireless communication device is to be used to determine the channel state is determined on the basis of position information on the plurality of in-vehicle wireless communication devices notified of in the position information notification step.

10. An in-vehicle wireless communication device constituting a wireless communication system configured of a plurality of in-vehicle wireless communication devices executing cooperative spectrum sensing,
    the in-vehicle wireless notification device comprising:
    decorrelation time acquisition means for acquiring a first decorrelation time, which is a time interval in which channel fluctuations resulting from multipath fading are decorrelated, and a second decorrelation time, which is a time interval in which channel fluctuations resulting from shadow fading are decorrelated;
    sensing means for performing repeated sensing at a time interval equal to or longer than the first decorrelation time;
    sensing result notification means for performing wireless transmission of a plurality of most recent sensing results at a time interval equal to or longer than the second decorrelation time; and
    channel state determination means for determining a state of a channel on the basis of the plurality of sensing results transmitted from the plurality of in-vehicle wireless communication devices.

11. The in-vehicle wireless communication device according to claim 10, further comprising
    decorrelation distance acquisition means for acquiring a first decorrelation distance, which is a distance at which channel fluctuations resulting from multipath fading are decorrelated, and a second decorrelation distance, which is a distance at which channel fluctuations resulting from shadow fading are decorrelated, wherein
    by the decorrelation distance acquisition means, the first decorrelation time and the second decorrelation time are calculated by dividing the acquired first decorrelation distance and second decorrelation distance by the slowest movement speed among movement speeds of the plurality of in-vehicle wireless communication devices.

12. The in-vehicle wireless communication device according to claim 11, further comprising
    decorrelation distance storage means for storing the first decorrelation distance and the second decorrelation distance for each category of location; and
    environment recognition means for acquiring position information on the in-vehicle wireless communication device or a surrounding image thereof and determining a category of the location where the in-vehicle wireless communication device is positioned on the basis of the acquired position information or surrounding image, wherein
    the decorrelation distance acquisition means acquires the first decorrelation distance and the second decorrelation distance at the location where the in-vehicle wireless communication device is positioned on the basis of the category of the location recognized by the environment recognition means and the first decorrelation distance and the second decorrelation distance for each category of locations stored in the decorrelation distance storage means.

13. The in-vehicle wireless communication device according to claim 10, further comprising:
    peripheral vehicle information acquisition means for acquiring position information on other in-vehicle wireless communication devices; and
    transmitting node determination means for determining an in-vehicle wireless communication device transmitting the plurality of sensing results, on the basis of the position information on the plurality of in-vehicle wireless communication devices which has been acquired by the peripheral vehicle information acquisition means.

14. The in-vehicle wireless communication device according to claim 13, wherein
    the transmitting node determination means determines a leading in-vehicle wireless communication device, from among the plurality of in-vehicle wireless communication devices, as the in-vehicle wireless communication device transmitting the sensing result, and
    repeatedly determines the closest in-vehicle wireless communication device, which is separated by the second decorrelation distance or a larger distance from the in-vehicle wireless communication device determined to transmit the sensing result, as the in-vehicle wireless communication device transmitting the sensing result.

15. The in-vehicle wireless notification device according to claim 10, further comprising:
- peripheral vehicle information acquisition means for acquiring position information on other in-vehicle wireless communication devices, wherein
- the channel state determination means determines a channel state by using the sensing results transmitted from in-vehicle wireless communication devices separated from each other by the second decorrelation distance or a larger distance, from among the plurality of in-vehicle wireless communication devices.

* * * * *